(12) United States Patent
Zhang et al.

(10) Patent No.: US 8,634,726 B2
(45) Date of Patent: Jan. 21, 2014

(54) POLARIZATION AND DIFFERENTIAL-GROUP-DELAY INSENSITIVE DIGITAL TIMING ERROR DETECTION FOR POLARIZATION-MULTIPLEXED COHERENT OPTICAL SYSTEMS

(75) Inventors: Bo Zhang, San Jose, CA (US); Sunil Kumar Singh Khatana, Sunnyvale, CA (US)

(73) Assignee: Opnext Subsystems, Inc., San Jose, CA (US)

( * ) Notice: Subject to any disclaimer, the term of this patent is extended or adjusted under 35 U.S.C. 154(b) by 71 days.

(21) Appl. No.: 13/471,190

(22) Filed: May 14, 2012

(65) Prior Publication Data

US 2012/0288275 A1  Nov. 15, 2012

Related U.S. Application Data

(60) Provisional application No. 61/486,073, filed on May 13, 2011.

(51) Int. Cl.
*H04B 10/06* (2011.01)
(52) U.S. Cl.
USPC ............ 398/208; 398/202; 398/205; 398/25; 398/152
(58) Field of Classification Search
USPC .............. 398/25, 27, 65, 202, 204, 205, 208, 398/149, 152
See application file for complete search history.

(56) References Cited

U.S. PATENT DOCUMENTS

| | | | | |
|---|---|---|---|---|
| 5,227,623 A * | 7/1993 | Heffner | .......................... | 250/225 |
| 7,076,169 B2 * | 7/2006 | Shpantzer et al. | .............. | 398/76 |
| 7,142,585 B2 * | 11/2006 | Baltersee et al. | ............. | 375/148 |
| 7,333,532 B2 * | 2/2008 | Baltersee et al. | ............. | 375/148 |
| 7,636,525 B1 * | 12/2009 | Bontu et al. | .................. | 398/208 |
| 7,894,728 B1 * | 2/2011 | Sun et al. | ..................... | 398/208 |
| 8,244,142 B2 * | 8/2012 | Wagner et al. | ................ | 398/208 |
| 8,265,491 B2 * | 9/2012 | Zhou | ............................ | 398/208 |
| 8,364,038 B2 * | 1/2013 | Mizuguchi et al. | ............. | 398/65 |
| 8,385,747 B2 * | 2/2013 | Roberts et al. | ................ | 398/150 |
| 2005/0018792 A1 * | 1/2005 | Singh | ........................... | 375/340 |
| 2010/0045974 A1 * | 2/2010 | Kaertner et al. | .............. | 356/218 |
| 2010/0052796 A1 * | 3/2010 | Menkhoff | ........................ | 331/17 |
| 2010/0142971 A1 * | 6/2010 | Chang et al. | ................. | 398/154 |
| 2010/0329677 A1 * | 12/2010 | Kaneda et al. | ................. | 398/65 |
| 2011/0007625 A1 * | 1/2011 | Kataoka | ....................... | 370/208 |
| 2011/0026650 A1 * | 2/2011 | Molina et al. | ................. | 375/344 |
| 2012/0008723 A1 * | 1/2012 | Stojanovic | .................... | 375/355 |
| 2012/0069941 A1 * | 3/2012 | Herbig | .......................... | 375/347 |
| 2012/0106982 A1 * | 5/2012 | Wagner et al. | ................ | 398/208 |
| 2013/0022351 A1 * | 1/2013 | Arikawa | ......................... | 398/25 |
| 2013/0039665 A1 * | 2/2013 | Hauske | ......................... | 398/202 |

OTHER PUBLICATIONS

Gardner, F. M.; A BPSK/QPSK Timing-Error Detector for Sampled Receivers; May 1986; pp. 423-429; IEEE Transactions on Communications, v. COM-34.

(Continued)

*Primary Examiner* — Daniel Washburn
*Assistant Examiner* — Hibret Woldekidan
(74) *Attorney, Agent, or Firm* — Fenwick & West LLP

(57) ABSTRACT

Digital timing error detection systems and techniques are described. The described techniques are independent of polarization and differential-group-delay and are used to perform timing recovery of polarization-multiplexed coherent optical systems.

12 Claims, 7 Drawing Sheets

(56) References Cited

OTHER PUBLICATIONS

Hauske et al; Impact of Optical Channel Distortions to Digital Timing Recovery in Digital Coherent Transmission Systems; 12th International Conference on Transparent Optical Networks; 2010; pp. 1-4; IEEE.

Sun et al; A Novel Dispersion and PMD Tolerant Clock Phase Detector for Coherent Transmission Systems; OMU4; 2011; OFC.

* cited by examiner

POLARIZATION AND DIFFERENTIAL-GROUP-DELAY INSENSITIVE DIGITAL TIMING ERROR DETECTION FOR POLARIZATION-MULTIPLEXED COHERENT OPTICAL SYSTEMS

CROSS-REFERENCE TO RELATED APPLICATIONS

This application claims the benefit under 35 U.S.C. §119(e) of the filing date of U.S. Provisional Patent Application No. 61/486,073, entitled "Polarization and Differential-Group-Delay Insensitive Digital Timing Recovery Technique for Polarization-Multiplexed Coherent Optical Systems", filed May 13, 2011, which is incorporated here by reference.

TECHNICAL FIELD

The disclosure is generally related to timing error recovery in coherent quadrature phase shift keying (QPSK) optical receivers.

BACKGROUND

High speed fiber-optic communication systems rely on advanced digital signal processing techniques to combat various fiber transmission impairments. One of the building blocks inside a digital receiver is a timing recovery circuit. The purpose of this block is to detect sampling frequency offsets and continuously restore correct timing for incoming digital samples. The establishment of digital synchronization is important for subsequent channel equalization and carrier recovery.

Timing error detectors (TED) based on Gardner's algorithm (F. M. Gardner, "A BPSK/QPSK Timing-Error Detector for Sampled Receivers", IEEE Transactions on Communications, v. COM-34, p. 423-429, May 1986, the content of which is incorporated herein by reference) can be used to operate RF binary phase shift keying (BPSK) and QPSK digital systems. However, for fiber-optic channels, polarization and associated dispersion impairments are problems that need to be addressed carefully. For instance, a Gardner-based TED can lose detection sensitivity under certain polarization conditions, and thus can lead to malfunctioning of timing recovery circuits. (See, e.g., F. N. Hauske et al., "Impact of Optical Channel Distortions to Digital Timing Recovery in Digital Coherent Transmission Systems", 12th International Conference on Transparent Optical Networks, p. 1-4, IEEE 2010, the content of which is incorporated herein by reference). Specifically, half-symbol differential group delay (DGD) together with equal mixing between the two polarization fields is recognized as a "dead zone" for conventional Gardner-based TED. Due to the dynamic nature of polarization in the fiber channel, this "dead zone" translates into unpredictable system outages which need to be solved before an optical transponder can be deployed in field links. Furthermore, this dead zone also prevents implementation of a transmitter side symbol interleaving scheme.

A proposed technique to mitigate this problem has been proposed by Sun. (Han Sun et al., "A Novel Dispersion and PMD Tolerant Clock Phase Detector for Coherent Transmission Systems", OFC 2011, OMU4, the content of which is incorporated herein by reference). However, Sun relies on a secondary adaptation loop which needs to track two individual phase parameters. Furthermore, Sun only addresses the polarization rotation issue at a fixed half-symbol DGD. TED across the whole DGD range has not been demonstrated by Sun.

What is needed is polarization and differential-group-delay insensitive digital timing error detection for polarization-multiplexed coherent optical systems.

DETAILED DESCRIPTION

Figure 1A:
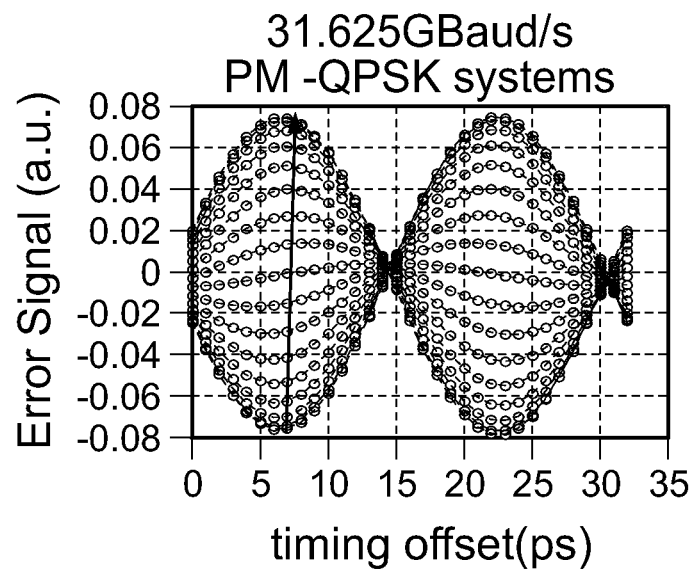
FIGS. 1A and 1C are plots of error signal versus timing offset.

Gardner's timing error detector (TED), also referred to as Gardner-based TED, can use a timing error signal TES given by $$TES = \sum_{n=0}^{\frac{N}{2}-1} R_X(2n) \cdot [R_X(2n+1) - R_X(2n-1)]^*,$$

where the TES is retrieved from one of the two polarizations (X,Y), in this case from X polarization signals, denoted as $R_X(n)$, in the time domain. Note that the Gardner-based TED is based on T-spaced processing. Based on Sun, TES can be rewritten using a discrete Fourier transform as, $$TES = -2 \cdot \sum_{k=0}^{\frac{N}{2}-1} \operatorname{Im}\left[X(k) \cdot X^*\left(k + \frac{N}{2}\right)\right].$$

To understand why the above TES loses detection sensitivity at half-symbol DGD, the channel model can be expressed in the frequency domain as follows, $$\begin{bmatrix} R_X(\omega) \\ R_Y(\omega) \end{bmatrix} = \exp(-j\omega\tau_s) * \begin{bmatrix} \cos\alpha & \sin\alpha \\ -\sin\alpha & \cos\alpha \end{bmatrix} * \begin{bmatrix} \exp(-j\omega\tau) & 0 \\ 0 & 1 \end{bmatrix} * \begin{bmatrix} S_X(\omega) \\ S_Y(\omega) \end{bmatrix}.$$

$S(\omega)$ and $R(\omega)$ are the Fourier transform of the transmitted and received electrical field vectors, respectively; subscripts denote polarization. The two matrices on the left hand side of the transmitted signal vector $[S_X \ S_Y]$ describe the state of polarization (SOP) rotation as well as differential group delay (DGD) along the channel. For simplicity, only first order polarization mode dispersion (PMD) is considered here, and without loss of generality, DGD is assumed to be applied to the electrical fields with no angle rotations. Systems and technologies for measuring polarization mode dispersion in optical devices are described in detail in U.S. Pat. No. 5,227,623, the disclosure of which is incorporated herein by reference. After photo-detection, an ADC introduces a timing offset, $\tau_s$, onto all four tributaries that the timing recovery system needs to correct. To view the above linear time invariant (LTI) system from the second-moment perspective, the Fourier transforms of the received electrical field vectors can be written as $$[R_X^*(\omega+\omega_s) \; R_Y^*(\omega+\omega_s)]* \begin{bmatrix} R_X(\omega+\omega_s) \\ R_Y(\omega+\omega_s) \end{bmatrix}^{T*} = \begin{bmatrix} S_X(\omega+\omega_s) \\ S_Y(\omega+\omega_s) \end{bmatrix}^{T*} * \begin{bmatrix} \exp(-j(\omega+\omega_s)\tau) & 0 \\ 0 & 1 \end{bmatrix}^{T*} * \begin{bmatrix} \cos\alpha & \sin\alpha \\ -\sin\alpha & \cos\alpha \end{bmatrix}^{T*} * \exp(-j(\omega+\omega_s)\tau_s).$$

Superscripts T and * denote transpose and complex conjugate, respectively. $\omega_s$ is the baud rate frequency which contains the clock info.

Multiplying the vectors on the left hand sides of the expressions above and integrating over $\omega$ leads to the following receiver spectral correlation matrix. In the frequency domain, this is equivalent to the multiplication of the channel correlation matrix with the transmitter spectral correlation matrix.

$$\begin{bmatrix} R_{XX}(\omega,\omega_s) & R_{XY}(\omega,\omega_s) \\ R_{YX}(\omega,\omega_s) & R_{YY}(\omega,\omega_s) \end{bmatrix} = \begin{bmatrix} \cos\alpha & \sin\alpha \\ -\sin\alpha & \cos\alpha \end{bmatrix} * \begin{bmatrix} \exp(-j\omega_s\tau) & 0 \\ 0 & 1 \end{bmatrix} * \begin{bmatrix} \cos\alpha & -\sin\alpha \\ \sin\alpha & \cos\alpha \end{bmatrix} * \exp(-j\omega_s\tau_s) * \begin{bmatrix} S_{XX}(\omega,\omega_s) & 0 \\ 0 & S_{YY}(\omega,\omega_s) \end{bmatrix}.$$

The first three matrices on the right hand side shape the polarization correlation matrix, and may be expanded as:

$$\begin{bmatrix} \cos\left(\frac{\omega_s\cdot\tau}{2}\right)+j\cdot\cos(2\alpha)\cdot\sin\left(\frac{\omega_s\cdot\tau}{2}\right) & -j\cdot\sin(2\alpha)\cdot\sin\left(\frac{\omega_s\cdot\tau}{2}\right) \\ -j\cdot\sin(2\alpha)\cdot\sin\left(\frac{\omega_s\cdot\tau}{2}\right) & \cos\left(\frac{\omega_s\cdot\tau}{2}\right)-j\cdot\cos(2\alpha)\cdot\sin\left(\frac{\omega_s\cdot\tau}{2}\right) \end{bmatrix}.$$

This expression shows that the polarization correlation matrix disturbs the proper detection of the timing error signal, $\tau_s$, which leads to the loss of timing information at certain polarization states.

Gardner's TES is equivalent to the discrete form of the imaginary part of the autocorrelation term, Rxx. The autocorrelation term alone does not capture the entire channel information. All four terms inside the correlation matrix are needed to form the timing error signal. This leads to the following timing error signals:

$$\text{TES\_xx} = \sum_{n=0}^{\frac{N}{2}-1} R_X(2n)\cdot[R_X(2n+1)-R_X(2n-1)]^*;$$

$$\text{TES\_xy} = \sum_{n=0}^{\frac{N}{2}-1} R_X(2n)\cdot[R_Y(2n+1)-R_Y(2n-1)]^*;$$

$$\text{TES\_yx} = \sum_{n=0}^{\frac{N}{2}-1} R_Y(2n)\cdot[R_X(2n+1)-R_X(2n-1)]^*;$$

$$\text{TES\_yy} = \sum_{n=0}^{\frac{N}{2}-1} R_Y(2n)\cdot[R_Y(2n+1)-R_Y(2n-1)]^*.$$

These signals may be arranged in a timing error signal matrix:

$$\begin{bmatrix} TES_{XX} & TES_{XY} \\ TES_{YX} & TES_{YY} \end{bmatrix}.$$

Each element of the timing error signal matrix corresponds to the imaginary part of the corresponding element in a receiver spectral correlation matrix. In order to negate the impact of the polarization correlation matrix on timing error information, TED can be expressed as:

$$\text{TED}=\cos(A)^*(\text{TES}_{xx}-\text{TES}_{yy})-\sin(A)^*(\text{TES}_{xy}+\text{TES}_{yx})+(\text{TES}_{xx}+\text{TES}_{yy}), \quad \text{EQ. (1)},$$

where A is a polarization rotation angle that can be monitored from converged taps of an adaptive equalizer. The polarization rotation angle A is an indication of the degree of mixing between the two polarizations. In this specification, depending on the context, TED refers to timing error detection, or to timing error detector signal, or to timing error detector.

Simulations were carried out to implement TED based on EQ. (1). First, a $2^{16}$ (pseudo random bit stream) PRBS 128 Gbit/s PM-QPSK optical signal is formed to have a baud rate of 32 Gbaud/s. For each symbol period, 32 discrete points represent each symbol. The signal then traverses through a programmable DGD element, with slow and fast axes aligned to the transmitted X and Y polarization states. After the DGD is applied, a polarization controller rotates the two polarization states by a controllable angle before the signal hits the receiver. After coherent mixing, an ADC samples the four tributaries by 32× to retain all analog timing information.

The S-Curve, which is defined as the error signal versus the timing errors, usually determines the health of a TED. S-Curves for a Gardner-based TED and for the TED based on EQ. (1) are shown in FIGS. 1 and 2.

Illustration of half-symbol DGD "dead zone" (in acquisition mode)

Figure 1B:
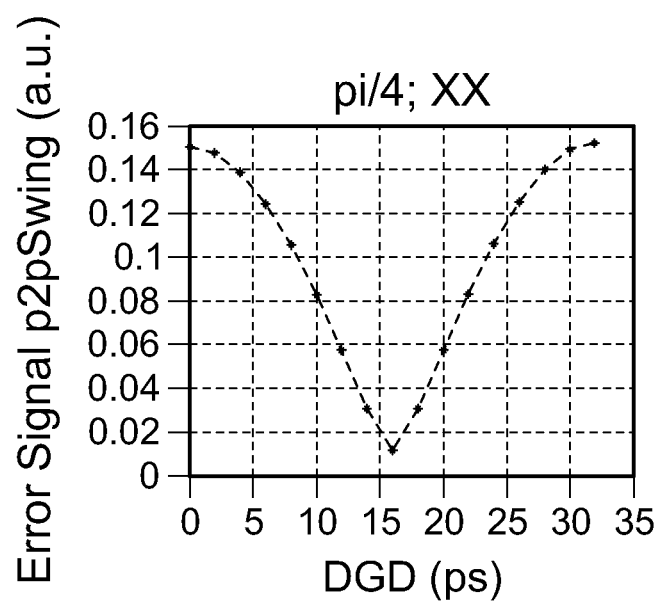
FIGS. 1B and 1D are plots of error signal peak-to-peak amplitude versus differential group delay.

The S-Curve for a Gardner-based TED (corresponding to TED_xx) is shown in FIGS. 1A and 1B. The error signal disappears (becomes substantially zero or is undefined) at π/4 rotation and half-symbol DGD (16 ps). This is the so called "dead zone".

Figure 1C:
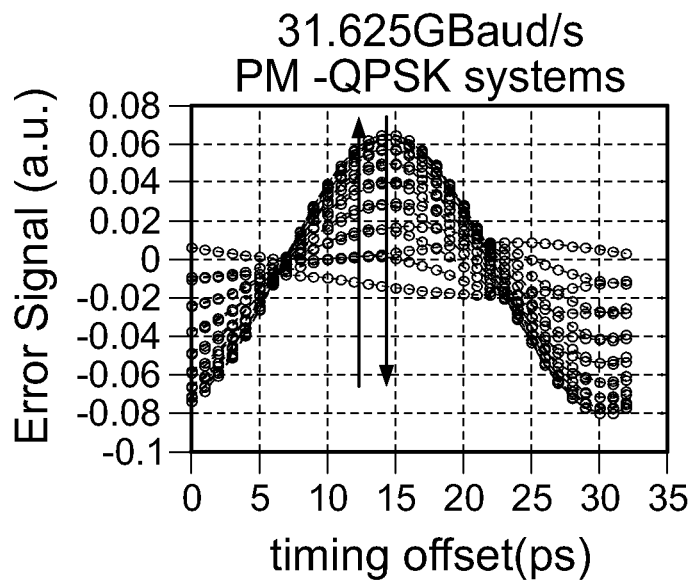
Figure 1D:
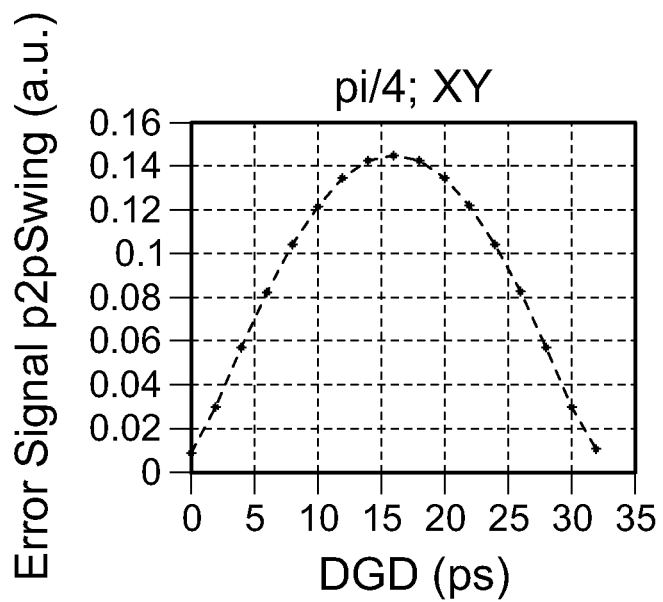

If the TED is formed using the cross-correlation term, TED_xy, as shown in the FIGS. 1C and 1D, the half-symbol DGD has a strong error signal. However, the "dead zone" gets shifted to other areas.

This shows that TED_xx and TED_xy exhibit pseudo-orthogonality. This property may be utilized during the acquisition mode of the techniques described in this specification by using TED_xx first, and then TED_xy if the former fails (e.g., if the output of TED_xx is zero or undefined.)

Two Dimensional Analysis (in Tracking Mode)

In the tracking mode, neither TED_xx nor TED_xy can be relied on. In order to cover both the rotation dimension, as well as the DGD dimension, the TED based on EQ. (1) can be used.

Figure 2A:
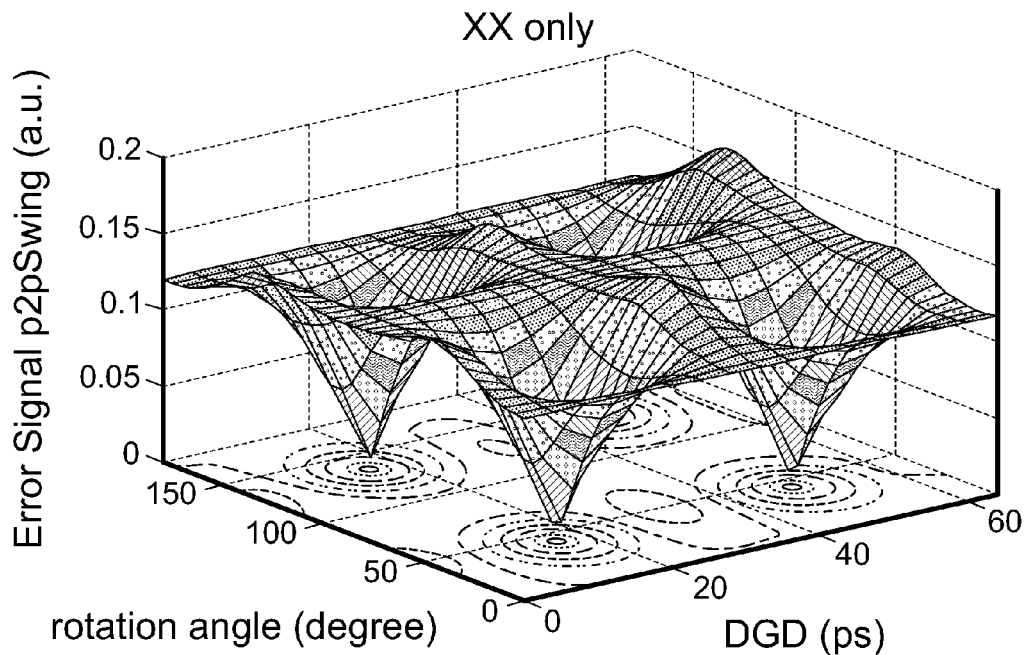
FIGS. 2A, 2B, 2E and 2F are plots of error signal peak-to-peak amplitude versus rotation angle and differential group delay.
Figure 2B:
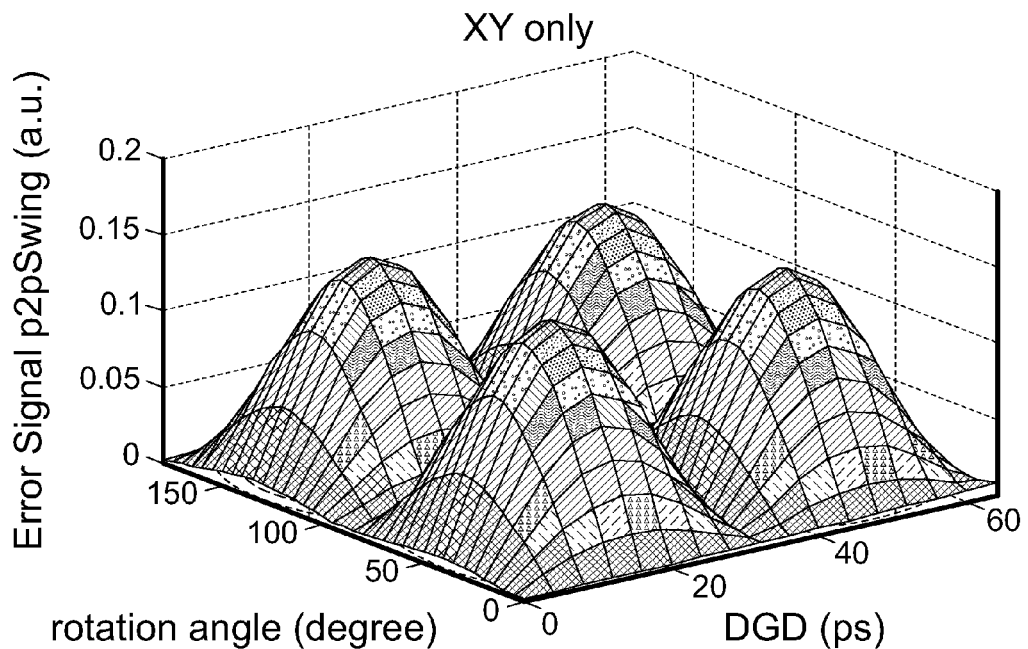
Figure 2C:
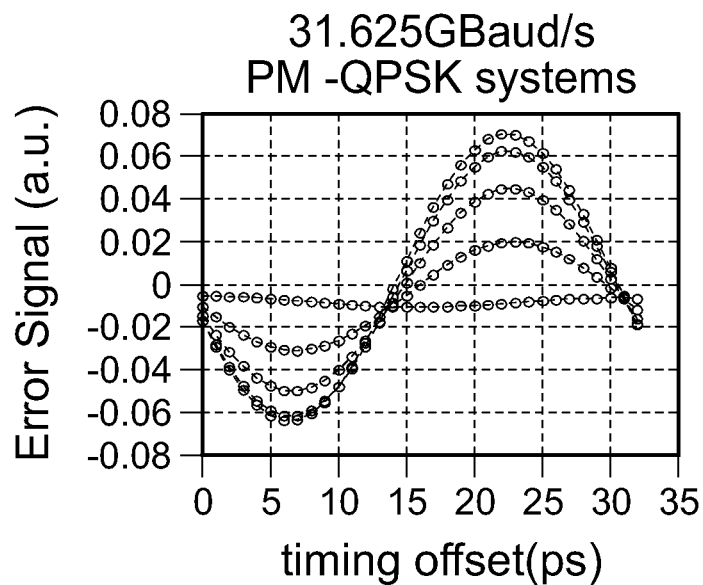
FIGS. 2C and 2D are plots of error signal versus timing offset.
Figure 2D:
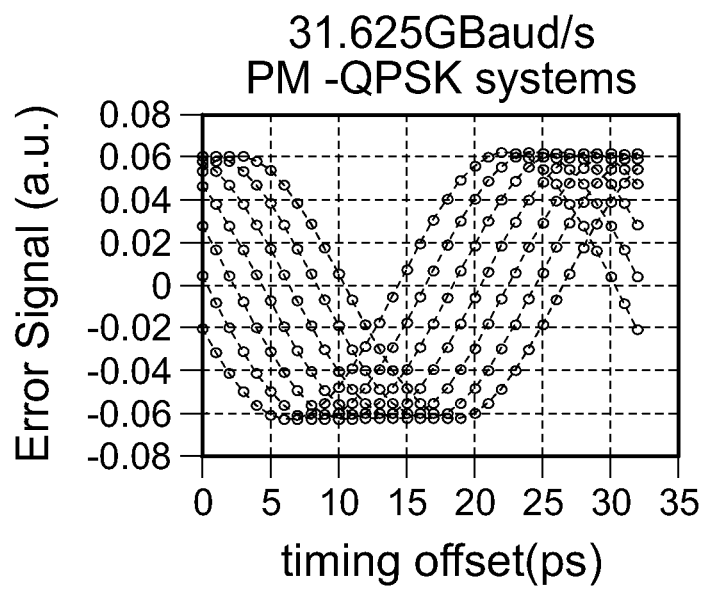
Figure 2E:
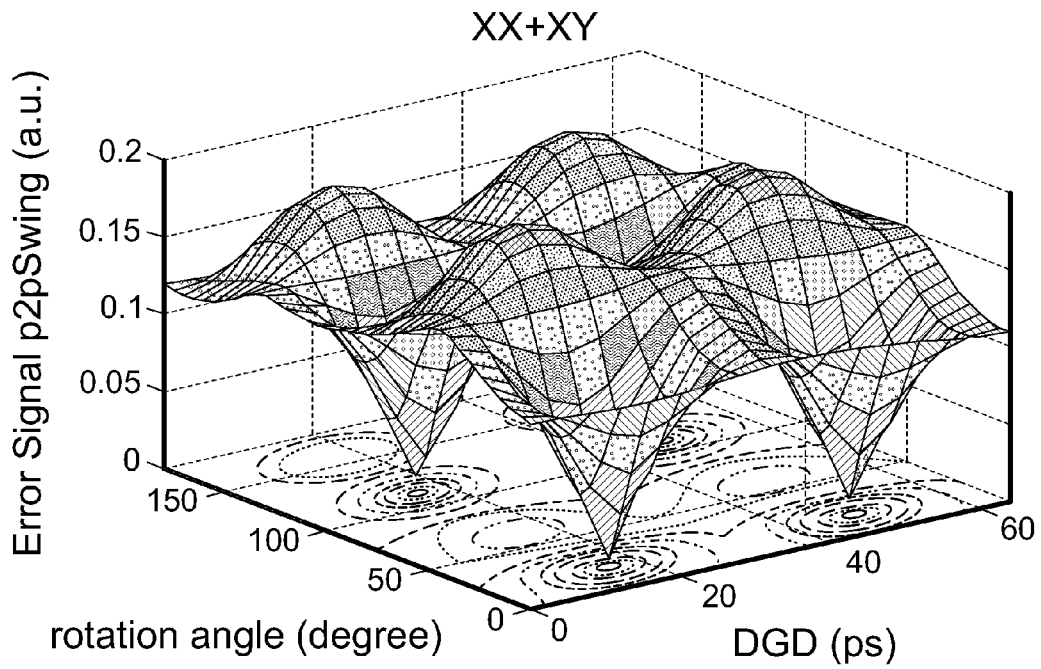
Figure 2F:
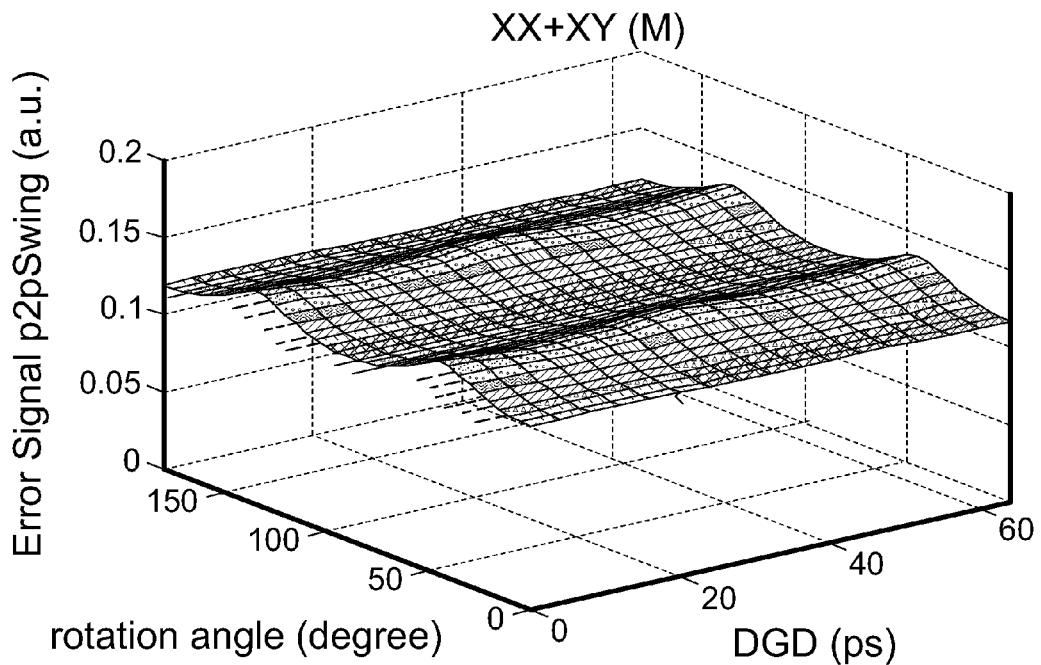

2-D results are shown in FIG. 2F. Unlike TED_xx (shown in FIG. 2A), TED_xy (shown in FIG. 2B), or TED_xx+TED_xy (shown in FIG. 2E) which give "dead zones", the TED based on EQ. (1) provides an un-compromised strength of the error signal versus any combination of polarization rotation or DGD values. DGD imparts a phase shift on detected timing errors. The sampling instant shifts caused by the DGD can be effectively compensated by an adaptive equalizer.

Thus the following digital timing error detection for polarization-multiplexed coherent optical systems is not affected by polarization rotation and differential group delay:

1. In the acquisition mode, the autocorrelation term TES_xx can be used first; if the digital timing error detection is zero or undefined when TES_xx is used, the digital timing error detection can be switched to the cross-correlation term TES_xy and the digital timing error detection can lock. Such acquisition mode works because the auto and cross-correlations are orthogonal from a polarization perturbation perspective.
2. In the tracking mode, an adaptive equalizer can continuously monitor the polarization mixing angles A and feeds them back to the four branches of the auto and cross correlation terms in the TED based on EQ. (1).

Figure 3A:
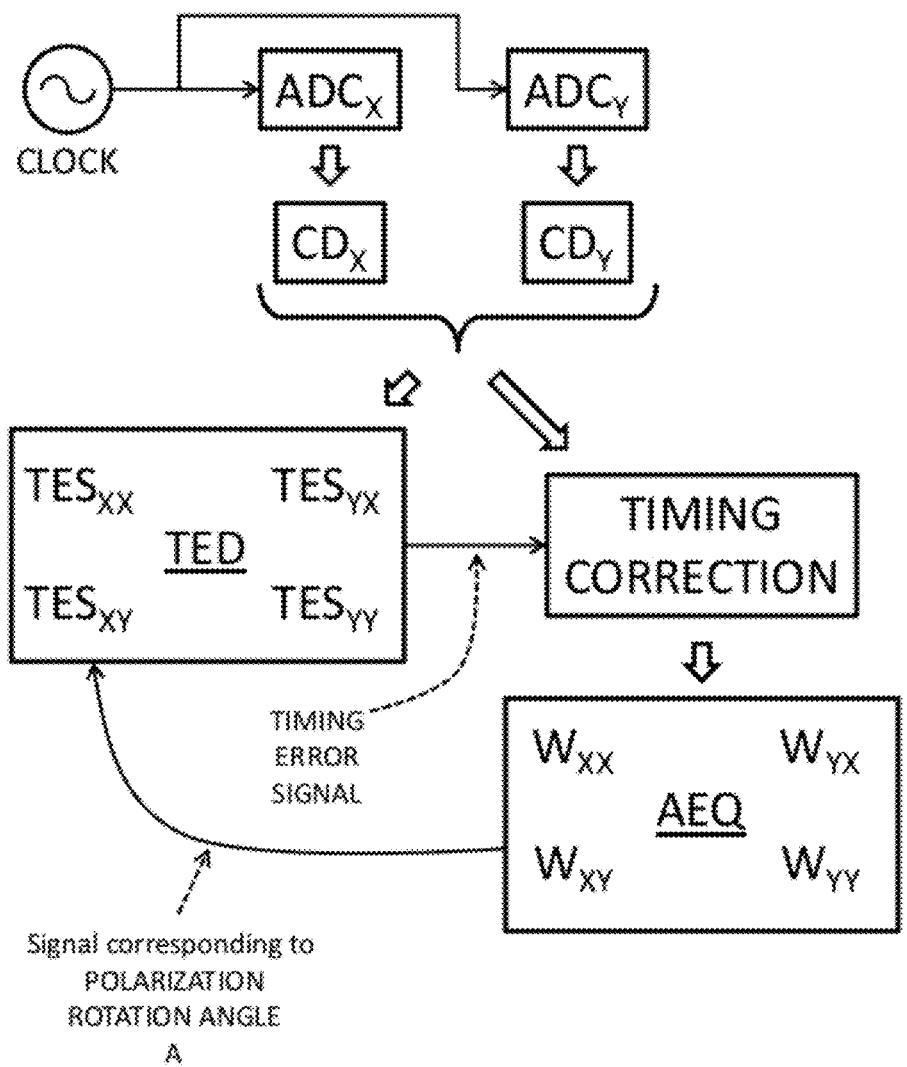
FIGS. 3A and 3B are examples of block diagrams of signal paths in part of a coherent PM-QPSK optical receiver.
Figure 3B:
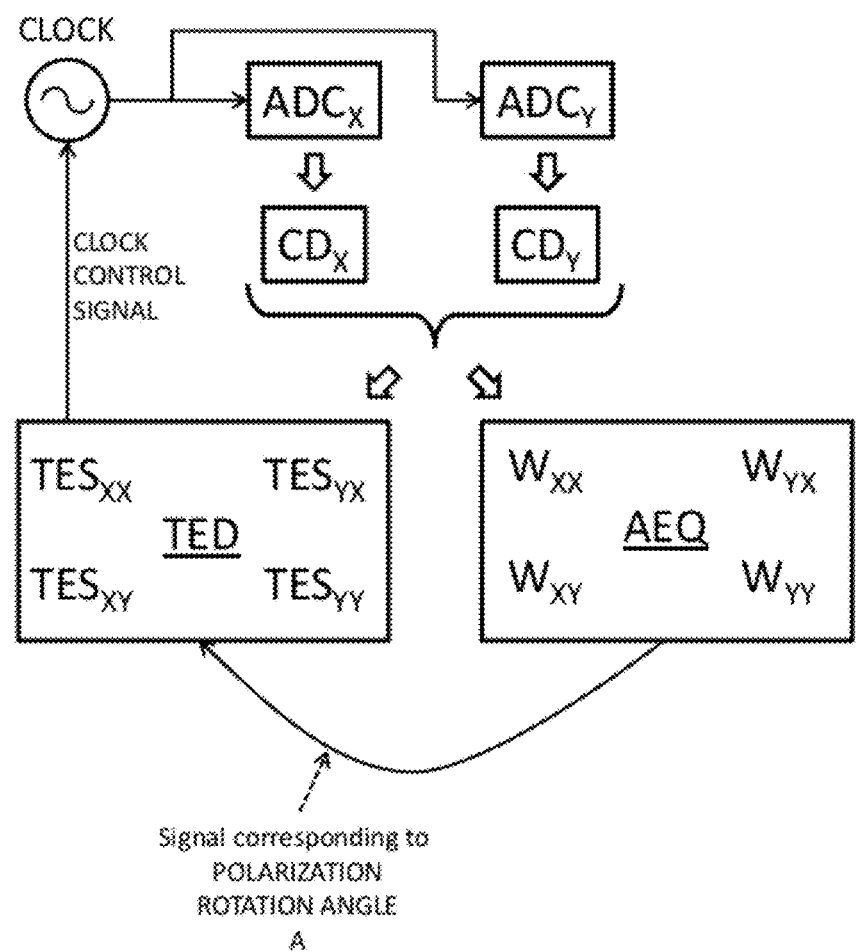

FIGS. 3A-3B are simplified block diagrams of signal paths in part of a coherent PM-QPSK optical receiver. Such receivers are described in detail in commonly assigned copending U.S. patent application Ser. No. 12/914,337 entitled, "Coherent Optical Receiver with adaptive equalizer initialization system," the disclosure of which is incorporated herein by reference. FIGS. 3A-3B show $ADC_X$ and $ADC_Y$—analog to digital converters for electrical signals representing data in X and Y polarization channels, respectively; $CD_X$ and $CD_Y$—chromatic dispersion compensators for electrical signals representing data in X and Y polarization channels, respectively; TED—a timing error detector that operates on timing error signals $TES_{XX}$, $TES_{XY}$, $TES_{YX}$ and $TES_{YY}$ as described above; and, AEQ—an adaptive equalizer. Block arrows represent data paths while solid arrows represent timing and control signals. A coherent optical mixer and photodetector that produce analog electrical data signals that correspond to in-phase and quadrature components of X and Y polarization optical signals are not shown in FIGS. 3A-3B.

The AEQ can provide to the TED a signal relating to the polarization rotation angle A. The latter signal is an indication of the degree of mixing between the X and Y polarizations. The functional blocks represented in FIGS. 3A-3B may be implemented in a field programmable gate array (FPGA) or application specific integrated circuit (ASIC).

FIG. 3A shows an example of a receiver in which the ADC clock is free running and the TED sends a timing error signal to a timing correction block. The timing correction block corrects data timing errors before the data is sent to the AEQ. FIG. 3B shows a receiver scheme with closed loop ADC clock control. In this case the TED generates a clock control signal that adjusts the ADC clock such that data sent to the AEQ is timed correctly. The timing error detection schemes described above may be used in either receiver scheme.

The above description of the disclosed embodiments is provided to enable any person skilled in the art to make or use the invention. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A method for timing error detection in a polarization-multiplexed coherent optical receiver comprising:
   in a timing error detector of the receiver, forming a timing error signal matrix:

$$\begin{bmatrix} TES_{XX} & TES_{XY} \\ TES_{YX} & TES_{YY} \end{bmatrix}$$

each element of the matrix being the imaginary part of a corresponding receiver spectral correlation matrix;
   acquiring initial timing error information from $TES_{XX}$; and,
   tracking timing error information, starting from the acquired initial timing error information, at least in part by evaluating a timing error detector signal:

$$TED = \cos(A)(TES_{XX} - TES_{YY}) - \sin(A)(TES_{XY} + TES_{YX}) + (TES_{XX} + TES_{YY}),$$

where A is a polarization rotation angle obtained from an adaptive equalizer of the receiver.

2. The method of claim 1, further comprising acquiring the initial timing error information from $TES_{XY}$ when a result of the acquisition of the initial timing error information from $TES_{XX}$ is zero or undefined.

3. The method of claim 1, further comprising timing an analog-to-digital converter of the receiver with a clock that is controlled based on the timing error detector signal.

4. The method of claim 1, further comprising
   correcting data timing errors of a data signal based on the timing error detector signal to obtain a corrected data signal; and
   sending the corrected data signal to an adaptive equalizer of the receiver.

5. The method of claim 1, wherein the elements of the timing error signal matrix comprise:

$$TES\_xx = \sum_{n=0}^{\frac{N}{2}-1} R_X(2n) \cdot [R_X(2n+1) - R_X(2n-1)]^*,$$

$$TES\_xy = \sum_{n=0}^{\frac{N}{2}-1} R_X(2n) \cdot [R_Y(2n+1) - R_Y(2n-1)]^*,$$

$$TES\_yx = \sum_{n=0}^{\frac{N}{2}-1} R_Y(2n) \cdot [R_X(2n+1) - R_X(2n-1)]^*, \text{ and}$$

$$TES\_yy = \sum_{n=0}^{\frac{N}{2}-1} R_Y(2n) \cdot [R_Y(2n+1) - R_Y(2n-1)]^*,$$

where $R_X$ and $R_Y$ correspond to data signals corresponding to X and Y polarizations, respectively.

6. A polarization-multiplexed coherent optical receiver comprising:
   a coherent mixer, photodetector and analog-to-digital converter that convert incoming polarization-multiplexed optical data signals into electrical data signals;
   a data receiver for demodulating and decoding the electrical data signals, the data receiver comprising
      an adaptive equalizer that monitors a degree of polarization mixing in the incoming optical data signals; and,
      a timing error detector operable in acquisition and tracking modes, the acquisition mode comprising acquisition of initial timing error detection signal from TES$_{XX}$, and the tracking mode comprising evaluation of a timing error detector signal TED=cos($A$)(TES$_{XX}$−TES$_{YY}$)−sin($A$)(TES$_{XY}$+TES$_{YX}$)+(TES$_{XX}$+TES$_{YY}$), where TES$_{XX}$, TES$_{XY}$, TES$_{YX}$, TES$_{YY}$, are imaginary parts of a corresponding receiver spectral correlation matrix, and A is a polarization rotation angle obtained from the adaptive equalizer as the degree of the polarization mixing.

7. The receiver of claim 6, further comprising:
a clock that provides timing to the analog-to-digital converter, and
a timing correction block that corrects data timing errors before the data is sent to the adaptive equalizer, the timing correction block receiving a timing error signal from the timing error detector.

8. The receiver of claim 6, further comprising a clock that provides timing to the analog-to-digital converter, the clock receiving a clock control signal from the timing error detector.

9. The receiver of claim 6, where the acquisition mode further comprises acquisition of the initial timing error detector signal from TES$_{XY}$ in the event that a result of the acquisition of timing error detector signal from TES$_{XX}$ is zero or undefined.

10. The receiver of claim 6, where the analog-to-digital converter and the data receiver including the adaptive equalizer and the timing error detector are implemented in a field programmable gate array.

11. The receiver of claim 6, where the analog-to-digital converter and the data receiver including the adaptive equalizer and the timing error detector are implemented in an application specific integrated circuit.

12. The receiver of claim 6, where the imaginary parts of the corresponding receiver spectral correlation matrix comprise:

$$\text{TES\_xx} = \sum_{n=0}^{\frac{N}{2}-1} R_X(2n) \cdot [R_X(2n+1) - R_X(2n-1)]^*,$$

$$\text{TES\_xy} = \sum_{n=0}^{\frac{N}{2}-1} R_X(2n) \cdot [R_Y(2n+1) - R_Y(2n-1)]^*.$$

$$\text{TES\_yx} = \sum_{n=0}^{\frac{N}{2}-1} R_Y(2n) \cdot [R_X(2n+1) - R_X(2n-1)]^*, \text{ and}$$

$$\text{TES\_yy} = \sum_{n=0}^{\frac{N}{2}-1} R_Y(2n) \cdot [R_Y(2n+1) - R_Y(2n-1)]^*,$$

where R$_X$ and R$_Y$ correspond to data signals corresponding to X and Y polarizations, respectively.

\* \* \* \* \*